S. BAIR.
CHURN.

No. 190,406. Patented May 8, 1877.

Witnesses.
A. Rupport
P. J. Hodges

Inventor:
Saml. Bair
D. P. Holloway & Co.
Attys.

UNITED STATES PATENT OFFICE

SAMUEL BAIR, OF SPENCERVILLE, INDIANA.

IMPROVEMENT IN CHURNS.

Specification forming part of Letters Patent No. 190,406, dated May 8, 1877; application filed February 23, 1877.

*To all whom it may concern:*

Be it known that I, SAMUEL BAIR, of Spencerville, in the county of De Kalb and State of Indiana, have invented a new and useful Improvement in Churns, of which the following is a specification:

This invention consists in the employment in a churn of two concentric frames, containing parallel, thin, and sharp cutting-blades, which rotate in opposite directions, the outer blades being so inclined, as to draw the cream toward the center of the churn.

Figure 1:
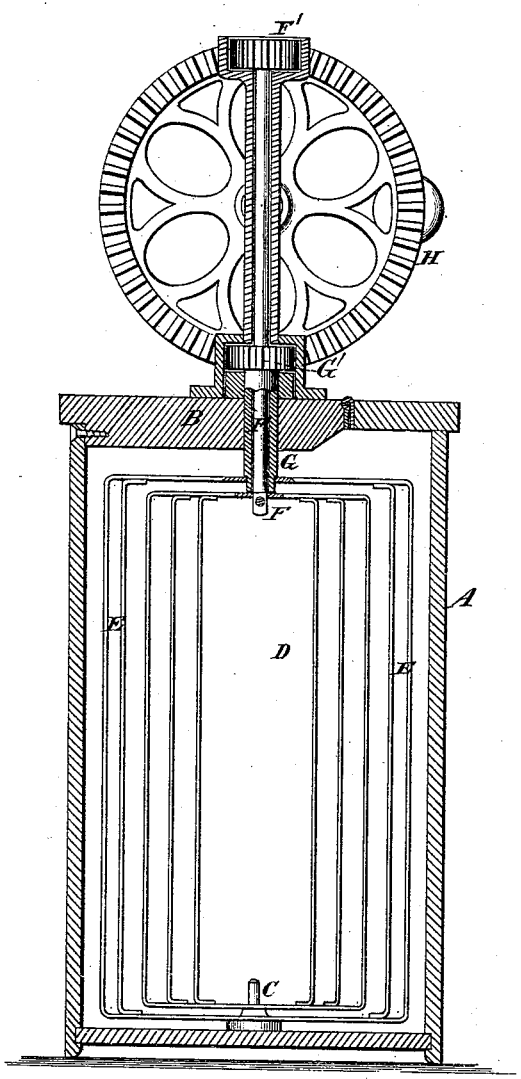
Figure 3:
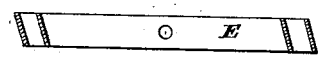
Figure 2:
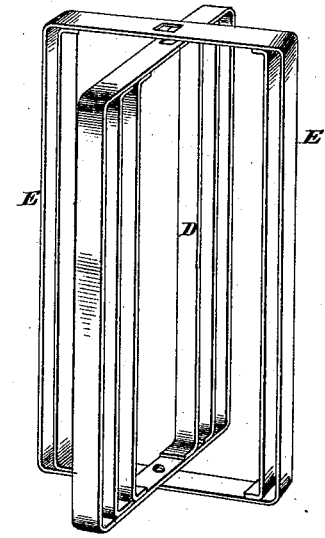

In the annexed drawings, making part of this specification, Figure 1 is a vertical longitudinal section, Fig. 2, a perspective view of the concentric frames, and Fig. 3 a horizontal section.

The same letters are employed in all the figures in the indication of identical parts.

A is the barrel of the churn, and B the cover. C is the bearing-pin placed in the center of the bottom to receive the revolving frames D and E. These are quadrilateral concentric frames, formed of a bottom piece, with a hole to fit on the bearing-pin, and a parallel top piece, with a hole for receiving the driving-shaft. The sides are formed by thin cutters, which are sharp-edged, and intended to cut through the cream, and not to act upon it in the ordinary manner, by dashing it violently against the sides, and revolving dashers. The exterior blades E are given a slight inclination from the line of their orbit, for the purpose of giving an inward movement to the cream from the barrel toward the center to bring it constantly under the action of the inner set of blades D, which revolve in an opposite direction, the form of the blades E creating a slight current in the cream, so as to bring all its particles under the action of the blades.

The frame D is fastened to the shaft F actuated by the pinion F' at the top of the driver H, and the frame E is attached to the tubular sleeve G, which is rotated in the opposite direction by the pinion G' at the bottom of the driver H. This driver is supported upon a proper frame, and driven by a crank.

The churn being filled with cream, and the crank revolved, the cutters on the concentric frame will be driven rapidly through the cream, breaking up its cells by their rapid action, thus greatly reducing the amount of force expended in operating the churn.

I am aware that substantially the same mechanism has been used for rotating the paddles or dashers commonly used in churning. My invention is confined to the thin blades as organized and driven.

What I claim as my invention, and desire to secure by Letters Patent, is—

The combination, in a churn, of the concentric frames carrying thin blades driven edgewise, the outer ones being slightly inclined to induce circulation, in combination with mechanism, substantially such as described, for causing their rapid rotation.

In testimony whereof I have signed my name to this specification in the presence of two subscribing witnesses.

SAMUEL BAIR.

Witnesses:
S. N. OLDS,
D. M. RIEDER.